United States Patent
Kim et al.

(10) Patent No.: US 9,407,834 B2
(45) Date of Patent: Aug. 2, 2016

(54) APPARATUS AND METHOD FOR SYNTHESIZING AN IMAGE IN A PORTABLE TERMINAL EQUIPPED WITH A DUAL CAMERA

(71) Applicant: Samsung Electronics Co., Ltd., Suwon-si, Gyeonggi-do (KR)

(72) Inventors: Daesung Kim, Seoul (KR); Sora Kim, Seoul (KR); Hyunkyoung Kim, Seoul (KR); Hangkyu Park, Seoul (KR); Seungkyung Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 14/188,232

(22) Filed: Feb. 24, 2014

(65) Prior Publication Data
US 2014/0240551 A1 Aug. 28, 2014

(30) Foreign Application Priority Data
Feb. 23, 2013 (KR) .................. 10-2013-0019525

(51) Int. Cl.
| | |
|---|---|
| H04N 5/265 | (2006.01) |
| H04N 5/232 | (2006.01) |
| H04N 5/262 | (2006.01) |
| H04N 5/272 | (2006.01) |
| H04N 5/225 | (2006.01) |

(52) U.S. Cl.
CPC ............ *H04N 5/265* (2013.01); *H04N 5/2258* (2013.01); *H04N 5/23293* (2013.01); *H04N 5/2621* (2013.01); *H04N 5/272* (2013.01)

(58) Field of Classification Search
CPC ..... H04N 5/265; H04N 5/2258; H04N 5/272; H04N 5/2621; H04N 5/23293; H04N 5/2226; H04N 1/00167; H04N 1/00196; G06T 7/40; G06T 7/0051; G06T 7/0079; G06T 7/0091; G06K 9/34; G06K 9/46; G06K 2207/20112; G06K 2207/20144

See application file for complete search history.

(56) References Cited

U.S. PATENT DOCUMENTS

| | | | | |
|---|---|---|---|---|
| 8,564,682 | B2* | 10/2013 | Kim | G06T 7/0083 348/14.07 |
| 8,599,271 | B2* | 12/2013 | Havens | H04N 5/2258 348/207.99 |
| 2003/0007700 | A1* | 1/2003 | Gutta | G06T 17/00 382/282 |
| 2005/0036044 | A1* | 2/2005 | Funakura | G06K 9/00228 348/239 |
| 2007/0285550 | A1 | 12/2007 | Son | |
| 2010/0008017 | A1* | 1/2010 | Ito | H01G 4/012 361/301.4 |
| 2010/0157022 | A1* | 6/2010 | Choi | H04N 5/23203 348/48 |
| 2011/0164105 | A1* | 7/2011 | Lee | H04N 7/142 348/14.02 |

(Continued)

FOREIGN PATENT DOCUMENTS

| | | |
|---|---|---|
| JP | 2005-204015 A | 7/2005 |
| KR | 10-0749337 B1 | 8/2007 |

*Primary Examiner* — Pritham Prabhakher
(74) *Attorney, Agent, or Firm* — Jefferson IP Law, LLP

(57) ABSTRACT

A method and an apparatus for processing an image in a portable terminal equipped with a dual camera are provided. The method includes selecting an image synthesis mode, performing a simultaneous or a sequential photographing of a front camera and a rear camera, obtaining a first image and a second image through the front camera and the rear camera, detecting an object image from one of the first image and the second image, and generating a synthesized image by synthesizing the object image to the other of the first image and the second image in which the object image was not detected.

20 Claims, 9 Drawing Sheets

(56) References Cited

U.S. PATENT DOCUMENTS

2012/0196649 A1* 8/2012 Havens ............... H04N 5/2258
455/556.1

2013/0094780 A1* 4/2013 Tang .................. G06T 11/60
382/284
2013/0235224 A1* 9/2013 Park .................. H04N 5/23222
348/218.1

* cited by examiner

APPARATUS AND METHOD FOR SYNTHESIZING AN IMAGE IN A PORTABLE TERMINAL EQUIPPED WITH A DUAL CAMERA

CROSS-REFERENCE TO RELATED APPLICATION(S)

This application claims the benefit under 35 U.S.C. §119 (a) of a Korean patent application filed on Feb. 23, 2013 in the Korean Intellectual Property Office and assigned Serial number 10-2013-0019525, the entire disclosure of which is hereby incorporated by reference.

TECHNICAL FIELD

The present disclosure relates to an image synthesizing apparatus and method of a portable terminal equipped with a dual camera. More particularly, the present disclosure relates to an apparatus and a method for synthesizing an image in a front side and a rear side of a camera obtained through a front camera and a rear camera, and automatically displaying an effect related to the synthesized image.

BACKGROUND

A portable camera of the related art and a portable terminal of the related art having a camera are equipped with a dual camera that is configured with a front camera and a rear camera, and these cameras are respectively mounted on a front and a rear of the portable terminal. In general, the portable terminal equipped with the dual camera photographs a front subject, or photographs a rear subject by independently selecting a front camera and a rear camera respectively.

For example, a dual camera portable terminal of the related art may photograph different images separately, and may store and manage the photographed images separately. Therefore, the dual camera portable terminal of the related art may not be able to simultaneously photograph, store, and synthesize both a front image and a rear image needed by a user at the time of photographing. Thus, to this end, a method of synthesizing or combining images through a post-correction, after photographing the images by sequentially operating two cameras should have been used. Similarly, since the image is overlapped when expressing an image on one screen, a user manipulation, such as an operation of manually disposing the image, is further needed.

In addition, in synthesizing the image, when a change in the synthesizing image is needed, it is inconvenient for the user to amend, change, or edit the image manually.

Therefore, there is a need for an apparatus and a method for synthesizing an image in a front side and a rear side of a camera obtained through a front camera and a rear camera, and automatically displaying an effect related to the synthesized image.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image synthesizing apparatus and method of a portable terminal equipped with a dual camera capable of synthesizing a front image and a rear image of a camera obtained through a front camera and a rear camera, and applying an effect related to the synthesized image.

In accordance with an aspect of the present disclosure, a method for synthesizing an image in a portable terminal equipped with a dual camera is provided. The method includes selecting an image synthesis mode, performing a simultaneous or a sequential photographing of a front camera and a rear camera, obtaining a first image and a second image through the front camera and the rear camera, detecting an object image from one of the first image and the second image, and generating a synthesized image by synthesizing the object image to the other of the first image and the second image in which the object image was not detected.

In accordance with another aspect of the present disclosure, an apparatus for synthesizing an image in a portable terminal equipped with a dual camera is provided. The apparatus includes a first camera configured to be mounted on a rear side of a portable terminal, and to obtain a first image, a second camera configured to be mounted on a front side of the portable terminal, and to obtain a second image, a controller configured to detect an object image from one of the first image and the second image, and to generate a synthesized image by synthesizing the object image to the other of the first image and second image in which the object image was not detected, and a display unit configured to display the synthesized image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
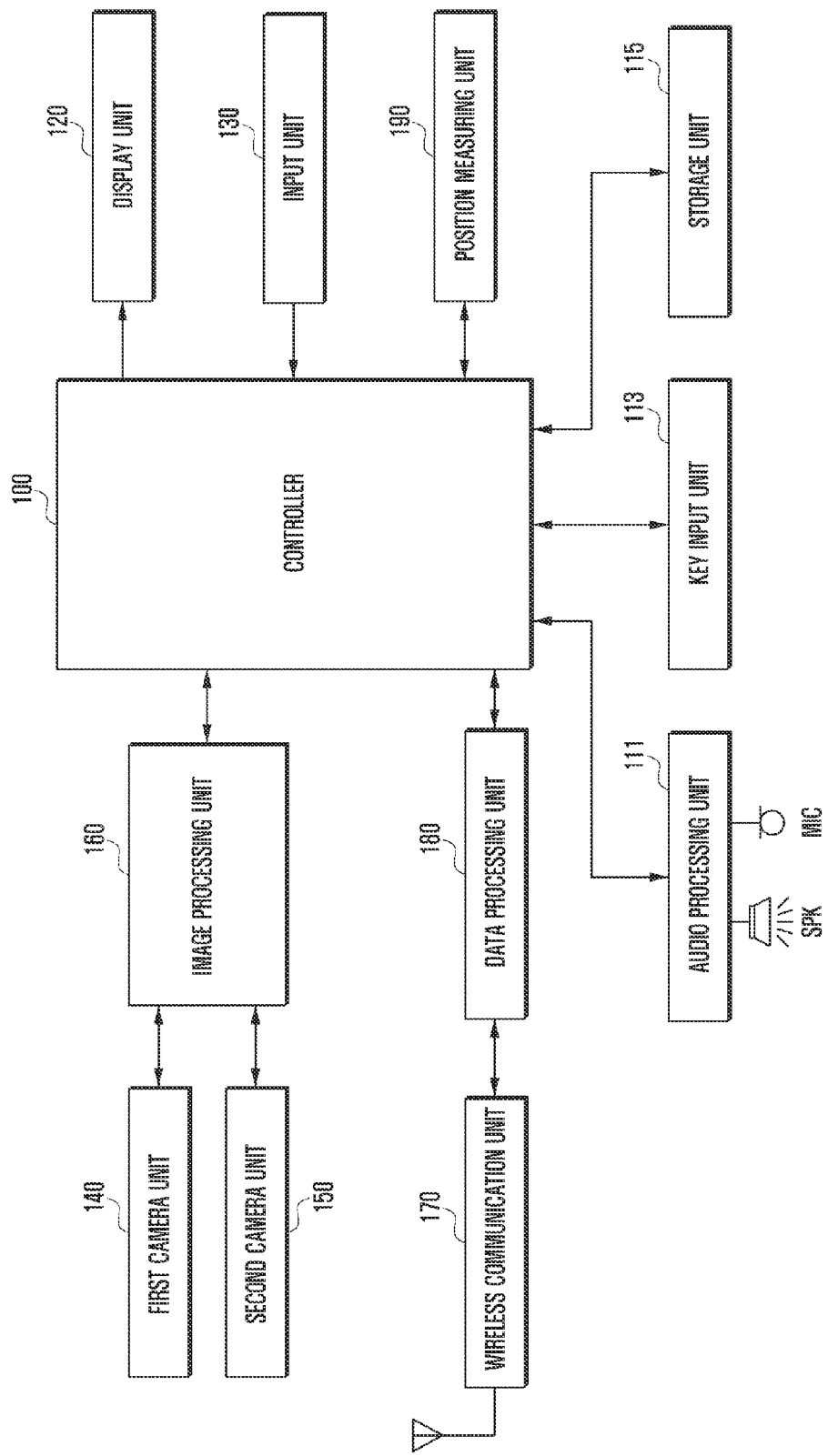
FIG. 1 illustrates a configuration of a portable terminal equipped with a dual camera according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In an embodiment of the present disclosure, a portable terminal may be applied to all information communication devices and multimedia devices, such as a tablet Personal Computer (PC), a mobile communication terminal, a mobile phone, a Personal Digital Assistant (PDA), a smart phone, an International Mobile Telecommunication 2000 (IMT-2000) terminal, a Code Division Multiple Access (CDMA) terminal, a Wideband Code Division Multiple Access (WCDMA) terminal, a Global System for Mobile communication (GSM) terminal, a General Packet Radio Service (GPRS) terminal, an Enhanced Data GSM Environment (EDGE) terminal, a Universal Mobile Telecommunication Service (UMTS) terminal, a Digital Broadcasting terminal, an Automated Teller Machine (ATM), and the like, and to an application corresponding to thereof.

In an embodiment of the present disclosure, a portable terminal equipped with a dual camera obtains a plurality of images by operating a front camera and a rear camera simultaneously, and displays the obtained image as a background image and a user image. For example, the portable terminal may obtain the user image through the front camera, and may obtain the background image through the rear camera, which can be changed by a user's camera selection.

In addition, the portable terminal equipped with the dual camera may photograph by operating the front camera and the rear camera simultaneously, or may photograph by operating the front camera and the rear camera sequentially according to the set order when the photographing in the dual mode is requested, and may generate as one still image by synthesizing the photographed user image and the background image. Here, the dual mode may be referred as an image synthesis mode to synthesize the user image and the background image.

In addition, the portable terminal equipped with the dual camera may edit or change the user image obtained through the front camera and the background image obtained through the rear camera. For example, the editing of the image may include the change of a size of the user image, the change of a position in the background image and/or the change of a type of the displayed user image, that is, a style change at the time of the synthesizing. At this time, the process of editing the user image may be performed at the time point when the dual camera operates, or an image that is photographed as a dual shot may be edited.

FIG. 1 illustrates a configuration of a portable terminal equipped with a dual camera according to an embodiment of the present disclosure.

Referring to FIG. 1, the portable terminal equipped with a dual camera may be configured to include a first camera unit 140, a second camera unit 150, an image processing unit 160, a controller 100, a display unit 120, an input unit 130, a position measuring unit 190, a wireless communication unit 170, a data processing unit 180, an audio processing unit 111, a key input unit 113, and a storage unit 115.

The first camera unit 140 and the second camera unit 150 may refer to the front camera and the rear camera, respectively, that are mounted in the portable terminal. The first camera unit 140 and the second camera unit 150 may be operated independently, or simultaneously under the control of the controller 100. In addition, under the control of the controller 100, the first camera unit 140 and the second camera unit 150 may photograph a still image or a video.

The first camera unit 140 may obtain a front image by photographing a background, an object, a person located on the front side of the portable terminal, and the like, and the second camera unit 150 may obtain a rear image by photographing a background, an object, a person located on the rear side of the portable terminal, and the like.

In an embodiment of the present disclosure, it is assumed that a photographer's image, that is, a user image is obtained through the first camera unit 140, and a background image is obtained through the second camera unit 150. An opposite case may be implemented depending on the intention of a designer or a user.

The image processing unit 160 may perform a function generating a screen data to display an image signal that is outputted from the first camera unit 140 and the second camera unit 150. The image processing unit 160 may process the image signal outputted from the first camera unit 140 and the second camera unit 150 for each frame unit, and may output the frame image data to the display unit 120. In addition, the image processing unit 160 includes an image codec, compresses the frame image data displayed on the display unit 120 by a set method, or may perform a function restoring the compressed frame image data to its origin frame image data. Here, the image codec may be a Joint Photographic Experts Group (JPEG) codec, a Motion Pictures Expert Group 4 (MPEG4) codec, a Wavelet codec, and the like. The image processing unit 160 may include an On Screen Display (OSD) function, and may output an on-screen display data according to a screen size which is controlled to be displayed by the controller 100.

The input unit 130 may receive an image synthesis mode from a user, may receive a command to change and convert the user image or the background image, and may receive a command to perform an effect related to the user image or the background image.

The display unit 120 may include a touch panel and a display panel. The touch panel may be placed on the display panel. The touch panel may generate an analog signal (e.g., a touch event) in response to a user gesture corresponding to the touch panel, and may deliver the analog signal to the controller 100 by performing an Analog to Digital conversion.

The controller 100 may detect the user gesture from the delivered touch event. The controller 100 may control the functions related to the present disclosure in response to the detected user gesture. The user gesture may be divided into a touch and a touch gesture.

Thereafter, the touch gesture may include a Tap, a Drag, a Flick, and the like. For example, a touch refers to a state of contacting a touch screen, and a touch gesture refers to a change of a touch from a touch-on event on the touch screen until a touch-off event from the touch screen.

The touch panel may be a complex touch panel that includes a hand touch panel detecting a hand gesture and a pen touch panel detecting a pen gesture. Here, the hand touch panel may be configured with a capacitive type. The hand touch panel may be configured with a resistive type, an infrared type, an ultrasonic type, and the like.

In addition, the hand touch panel may generate an event not only by the user hand gesture but also by other object (e.g., a conductive material object that may cause a capacitance change). The pen touch panel may be configured with an electromagnetic induction type. Accordingly, the pen touch panel may generate the touch event by a touch stylus pen designed to form a magnetic field.

The display panel may display an image data received from the controller 100 by converting into an analog signal under the control of the controller 100. For example, the display panel may display various screens (picture), for example, a lock screen, a home screen, an environment setting screen, an application (abbreviated as App) processing screen, and a key pad, and the like.

More particularly, the display panel of the present disclosure may display a user image obtained through the first camera unit 140, or may display a background image obtained through the second camera unit 150, and may display an image in which the user image and the background image are synthesized and to which a specific effect is applied. The user image, the background image, and the synthesized image may be displayed simultaneously, or displayed on different screen.

The wireless communication unit 170 may perform a wireless communication function with a base station or other device. The communication unit 170 may be a Radio Frequency (RF) communication unit configured with a transmission unit which performs a frequency up converting and an amplification of power of a transmitting signal, and a reception unit which performs a low noise amplification and a frequency down converting of a receiving signal. In addition, the wireless communication unit 170 may be equipped with a modulation unit and a demodulation unit. Here, the modulation unit may modulate and deliver the transmission signal to the transmission unit, and the demodulation unit may demodulate a signal received through the reception unit. In this case, the modulation unit and the demodulation unit may be a Long Term Evolution (LTE) unit, a WCDMA unit, a GSM unit, a WIFI unit, a Wireless Broadband (WIBRO), and the like. The wireless communication unit 170 may perform a wireless communication function between a terminal device and a corresponding network by accessing to a public wireless communication network and/or an Internet network. In addition, the wireless communication unit 170 may be equipped with an LTE communication unit and a WIFI communication unit that may communicate with an LTE base station.

More particularly, the wireless communication 170 according to an embodiment of the present disclosure may be used to transmit or receive the synthesized image in which the user image and the background image are synthesized by the controller 100 and to which the related specific effect is applied.

The audio processing unit 111 may perform a function of an input and an output of an audio signal for a voice recognition, a voice recording, a digital recording, a call function, and the like, by combining to a Speaker (SPK) and a Microphone (MIC).

The audio processing unit 111 may receive the audio signal from the controller 100, and may output to the SPK after performing digital to analog (D/A) conversion and amplifying the received audio signal. The audio processing unit 111 may provide the audio signal received from the MIC to the controller 100 after performing Analog to Digital (A/D) conversion of the received audio signal.

The key input unit 113 may include a plurality of keys (buttons) to receive number or character information and to set various functions. Such keys may include a menu fetch key, a screen on/off key, a power on/off key, a volume control key, and the like.

The key input unit 113 generates a key event related to a user setting and a function control of the portable terminal device, and delivers the key event to the controller 100.

The key event may include a power on/off event, a volume control event, a screen on/off event, and the like. The controller 100 may control the above configurations in response to such key event. Meanwhile, the key (button) of the key input unit 113 may be referred to as a hard key, and a key (button) displayed on the display unit 120 may be referred to as a soft key.

The storage unit 115 is a secondary memory unit of the controller 100, and may include a disc, a Random Access Memory (RAM), a Read Only Memory (ROM), a flash memory, and the like. The storage unit 115 may store data generated from the portable terminal device or received from an external device (e.g., a server, a desktop PC, a tablet PC, and the like) through the wireless communication unit 170 or an external device interface unit (not shown) under the control of the controller 100.

The storage unit 115 may store a booting program and an Operating System (OS) for an operation of the portable terminal device.

The storage unit 115 may include an embedded application and a 3rd party application. The embedded application refers to an application mounted on the portable terminal device. For example, the embedded application may be a browser, an email, and an instant messenger, and the like. The 3rd party application is very diverse and refers to an application downloaded to install on the portable terminal device from an online market as described below. This 3rd party application can be freely installed and controlled. When the portable terminal device is turned on, first, the booting program is loaded to a main memory device (e.g., a RAM) of the controller 100. Such booting program loads the operating system to the main memory device so that the portable terminal device can operate. In addition, the operating system loads and processes the applications to the main memory device.

More particularly, the storage unit 115 according to an embodiment of the present disclosure may store at least one of a user image obtained through the first camera unit 140, a background image obtained through the second camera unit 150, an image in which the user image and the background image are synthesized by the controller 100, and a synthesized image to which the stored effect related to the user image and the background image is applied.

In addition, the storage unit 115 may store at least one of a first effect which is previously mapped in relation to the user image and the background image, and a second effect which is previously mapped to at least one of a photographing based position information and a photographing based time information.

The first effect and the second effect may be one of a process of adding at least one of an emoticon, a letter, a number, a symbol, a picture, a voice, and an acoustic data, or a process of converting or editing at least one of a shape, a form, and a color of a synthesized image.

The position measuring unit 190 may be installed for a setting of the photographing based position, and may be configured with an ultrasonic position measuring system or a Global Positioning System (GPS).

The photographing based position information measured by the position measuring unit 190 is compared to a user's activity radius that is stored by the controller 100 so that it may be determined whether the photographing based position is within the user's activity radius.

In addition, the controller 100 may measure the photographing based time, and may determine whether the photographing based time corresponds to the user's stored schedule.

The controller 100 may control the overall operation of the portable terminal and a signal flow between the internal configurations of the portable terminal, may perform a data processing function, and may control a power supply from a battery to the configurations. The controller 100 may include a main memory device that stores an application program and an operating system, a cache memory that temporarily stores data to be written to the storage unit 115 and temporarily stores data read from the storage unit 115, a Central Processing Unit (CPU), a Graphic Processing Unit (GPU), and the like. Here, the operating system may serve as an interface between a hardware and a program, and manages computer resources, such as the CPU, the GPU, the main memory device, the secondary memory device, and the like.

For example, the operating system operates the portable terminal device, may determine the order of a task, and may control a CPU calculation and a GPU calculation. In addition, the operating system may perform a function of the application program, and a function of storing and managing data and a file.

Meanwhile, as described above, the CPU is an essential control unit of the computer system that may perform a calculation and a comparison of data, and an interpretation and processing of a command language. The GPU is a graphic control unit that may perform a calculation and a comparison of data related to a graphic, and an interpretation and processing of a command language on behalf of a CPU. The CPU and the GPU may be integrated into one package in which two or more independent cores (e.g., a quad-core) are formed as a single integrated circuit respectively. In addition, the CPU and the GPU may be integrated into one chip (i.e., a System on chip (SoC)). Further, the CPU and the GPU may be packaged as a multi-layer. Meanwhile, a configuration including the CPU and the GPU may be referred as an Application Processor (AP).

More particularly, the controller 100 according to the present disclosure may recognize an object, a person, a background, and the like, that are included in a first image and a second image obtained through the first camera unit 140 and the second camera unit 150. Similarly, the controller 100 may cut out a specific object or an image of a person detected from one of the first image and the second image and synthesize the cut-out object or person with the background recognized from other image. The cut-out image may be set as a user's entire body, a half body, a face area, and the like.

For example, the controller 100 may cut out a photographer image included in the first image and paste to a background area of a second image, and may synthesize the images obtained by a different camera.

When the cut-out image is displayed as an overlay on some part of the background image, or when a user performs a drag movement or performs a drag and drop interaction in the state of tapping the cut-out image, the controller 100 may change a position to which the background image is synthesized by moving the cut-out image according to a user's touch.

Here, the controller 100 may detect at least one of an area where a similar color is widely distributed among the first image or the second image, an area where a pattern is repeated in a certain interval, and an area where a person is excluded, as the background image. In addition, when the detected subject is identical to a stored landmark, the controller 100 may detect this image as the background image.

Further, the controller 100 may detect an image of a person among the subjects by using an infrared sensor or a body heat detecting means that detects a long infrared light corresponding to a body heat. For example, the controller 100 may determine the number of the user images according to the number of touches on the user image, and when the number of touches exceeds a certain number (e.g., the number of a set user image), then, the controller 100 may set the user image by changing into a group image.

In addition, the controller 100 may determine whether at least one of the obtained first image and the obtained second image is identical to the stored image. When the at least one of the obtained first image and the obtained second image is identical to the stored image, the controller 100 may extract a first effect mapped to a corresponding image, and may apply the first effect to the synthesized image.

The stored image may be at least one of a landmark, a specific object that is previously set and stored by the user, a specific person who is previously set and stored by the user, and the like.

The first effect may be at least one of a process of adding at least one of a letter, a number, a symbol, a picture, a voice, an acoustic data, an emoticon that indicates the information related to the first image or the second image to the synthesized image, and the like, and a process of converting or editing at least one of a shape, a form, a color of the synthesized first image or second image, and the like.

In addition, the controller 100 may detect at least one of the photographing based position information and the photographing based time information, may extract a second effect that is mapped to at least one of the detected position information and time information, and may apply the second effect to the synthesized image.

For example, the controller 100 may determine whether the collected position is within the user's stored activity radius, and whether the collected time corresponds to the user's stored scheduler, and accordingly, may extract the second effect.

For example, the controller 100 may automatically output the information related to at least one of a travel, a business trip, a housing, a company, a school, an academic institute, a commuting, commuting to and from school, a work, a study, an exercise, a relaxation, a dating, a meeting that is mapped to at least one of the detected photographing based position information or the photographing based time information to the synthesized image, as the second effect, and the like.

The second effect is data indicating the information related to at least one of the detected photographing based position information and the photographing based time information, and may be output as at least one type of an emoticon, a letter, a symbol, a number, a picture, a voice, an acoustic data, and the like.

In addition, the controller 100 may recommend an effect to be mapped to the synthesized image according to the detected image of a person and the background image to the user.

The recommended effect may be at least one of a process of converting or editing a shape, a form, and a color of a synthesized image according to the image of the person and the background image, a process of adding at least one of a letter, a number, a symbol, a picture, an emoticon, a voice, and the like, and an acoustic data indicating the information related to the image of the person and the background image to the synthesized image, and the like.

Figure 2:
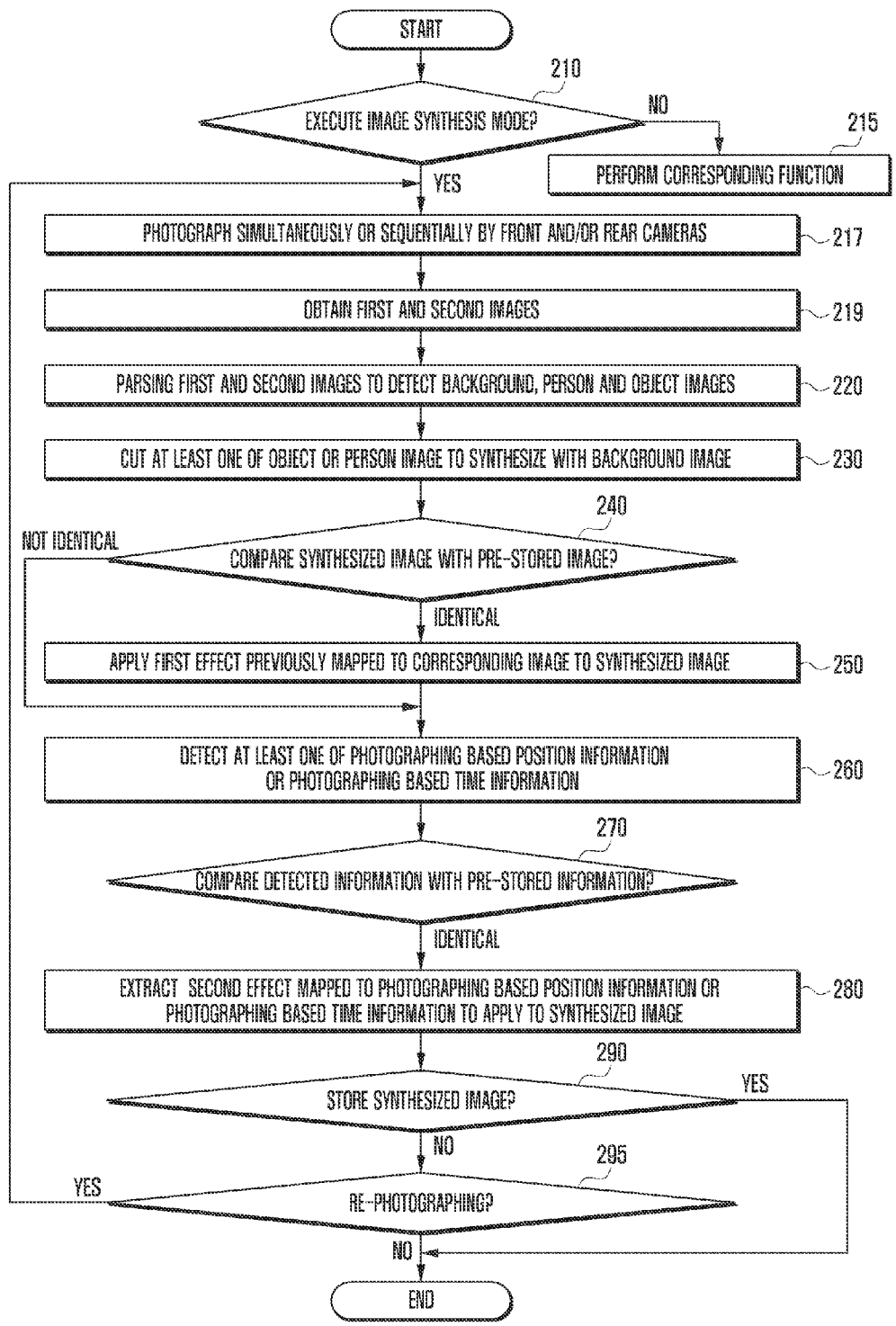
FIG. 2 is a flowchart illustrating a method for synthesizing an image in a portable terminal equipped with a dual camera according to an embodiment of the present disclosure.

FIG. 2 is a flowchart illustrating a method for synthesizing an image in a portable terminal equipped with a dual camera according to an embodiment of the present disclosure.

Referring to FIG. 2, the controller 100 may process a selection of an image synthesis mode by receiving a command to process a selection of an image synthesis mode from a user at operation 210. At this time, when the image synthesis mode is not selected, one camera of the front camera or the rear camera is processed, which is the general camera operation to perform a corresponding function at operation 215.

When selecting the image synthesis mode at operation 210, the controller 100 operates the front camera and the rear camera of the portable terminal simultaneously or sequentially at operation 217.

After operation 217, the controller 100 may obtain the first image through the front camera, and may obtain the second image through the rear camera at operation 219.

For example, the first image obtained through the front camera may be the user image obtained for the purpose of photographing a photographer himself, and the second image obtained through the rear camera may be the background image obtained for the purpose of photographing a background and a circumstance.

After operation 219, the controller 100 may parse the first image and the second image, and may detect an object, a person, and a background included in the image at operation 220. Here, the controller 100 may detect at least one of an area where a similar color of the first image or the second image is widely distributed, an area where a pattern is repeated in a certain interval, and an area excluding an area at which a person is located, as the background image. Similarly, when the detected subject is identical to the stored landmark, the controller 100 may detect the image of the subject as the background image. In addition, the controller 100 may detect a person or an animal from among the subjects by using an infrared sensor or a body heat detecting means that detects a long infrared corresponding to the body heat.

After operation 220, the controller 100 may cut out at least one of an object, an animal, and an image of a person detected from the first image or the second image, and may synthesize the cut-out image with the background recognized from the other image at operation 230. For example, the controller 100 may synthesize the image obtained by a different camera, by cutting out the photographer image that is included in the first image and pasting the photographer image to the background of the second image.

After operation 230, the controller 100 may determine whether the photographer image or the background image of the synthesized image is identical to the stored image at operation 240.

The stored image may be an image previously photographed and stored by the user by using the first camera unit 140 or the second camera unit 150 in the portable terminal, and the image may be stored by setting a specific effect by user. In addition, the stored image may be an image in which a major landmark is stored together with the specific effect as a default by a designer of the portable terminal At operation 240, when the photographer image or the background image of the synthesized image is identical to the stored image, the controller 100 may apply the first effect previously mapped to the corresponding image to the synthesized image at operation 250. On the other hand, when the photographer image or the background image of the synthesized image is not identical to the stored image, the process moves to operation 260.

The first effect may be at least one of a process of adding at least one of a letter, a number, a symbol, a picture, a voice, an acoustic data, an emoticon that indicates the information related to the user image or the background image to the synthesized image, and the like, and a process of converting or editing at least one of a shape, a form, a color of the synthesized first image or second image, and the like.

After operation 250, the controller 100 may detect at least one of the photographing based position information and the photographing based time information at operation 260, and may compare the detected information with pre-stored information at operation 270. For example, the controller 100 may determine whether the detected position is within the user's stored activity radius, and whether the collected time corresponds to the user's stored schedule.

Here, the photographing based position information may be detected by using a GPS configured within the portable terminal.

At operation 270, when the detected photographing based position information is within the stored activity radius, or the detected photographing based time information corresponds to the stored schedule, the controller 100 may extract the second effect mapped to the corresponding photographing based position information or the photographing based time information, and may apply to the synthesized image at operation 280.

For example, the controller 100 may automatically output the information related to at least one of a travel, a business trip, a housing, a company, a school, an academic institute, a commuting, commuting to and from school, a work, a study, an exercise, a relaxation, a dating, a meeting that are mapped to at least one of the detected photographing based position information or the photographing based time information to the synthesized image, and the like, as the second effect.

The second effect is data indicating information related to at least one of the detected photographing based position information and the photographing based time information, and may be output as at least one type of an emoticon, a letter, a symbol, a number, a picture, a voice, an acoustic data, and the like.

After operation 280, the controller 100 may determine whether the synthesized image is to be stored from the user through a pop-up window, may store the synthesized image to the storage unit 115 when a storing request is generated from the user, and may terminate an image synthesis mode at operation 290.

Alternatively, the controller 100 may query whether to re-photograph when the synthesized image storing request is not received at operation 295, and may progress a simultaneous or a sequential photographing through a front camera and a rear camera according to a response of the user corresponding to the re-photographing inquiry, or may terminate the image synthesis mode. Upon the termination of the processing of the image synthesis mode, the operation of the first camera unit 140 and the second camera unit 150 is also terminated.

FIGS. 3, 4, 5A, 5B, and 5C illustrate an image synthesizing in a portable terminal equipped with a dual camera according to an embodiment of the present disclosure.

Referring to FIGS. 3, 4, 5A, 5B, and 5C, when operating a camera in a portable terminal, the controller 100 displays a camera button 410 and a dual button 415 on an edge of a preview screen. Here, the camera button 410 is a button to select a camera for photographing an image that is displayed as a main screen, and the dual button 415 is a button to select on or off of the image synthesis mode.

In addition, in the preview screen, the controller 100 may display a still image button 420 that photographs a still image, a mode button 423 that can set a photographing mode of a camera, and a video button 425 that photographs a video. When operating the camera, it is assumed that the controller 100 operates a rear camera and performs a dual off mode, that is, an image synthesis mode off mode as a default.

In addition, it is assumed that the camera button 410 and the dual button 415 are operated as a toggle type. In the following description, it is assumed that the front camera photographs a photographer image, that is, the user image, and the rear camera photographs the background image.

Figure 3:
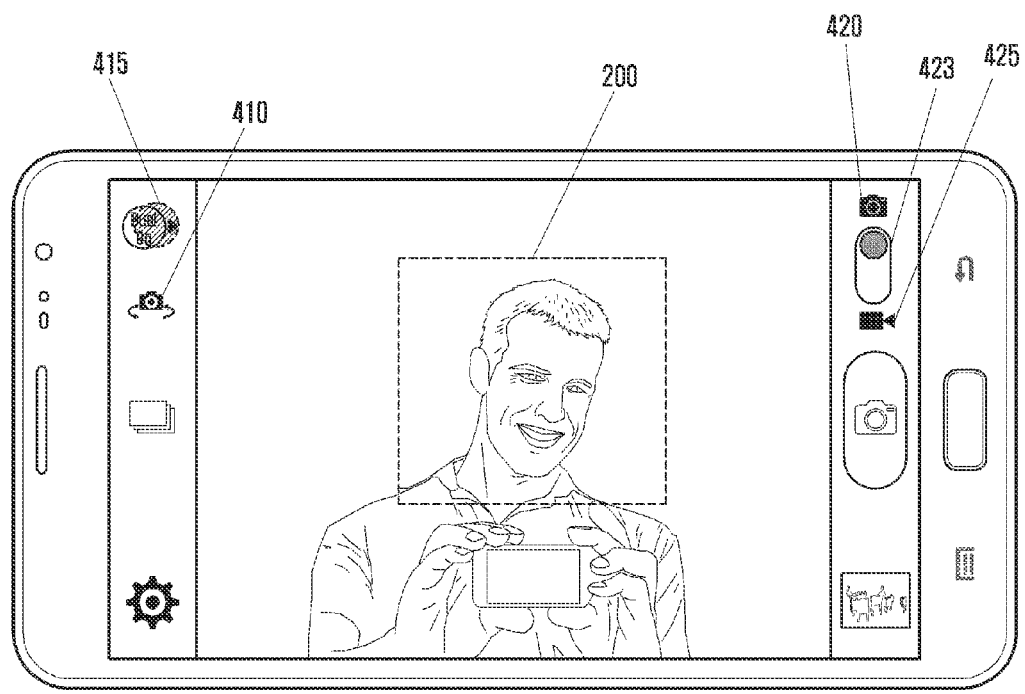
FIGS. 3, 4, 5A, 5B, and 5C illustrate an image synthesizing in a portable terminal equipped with a dual camera according to an embodiment of the present disclosure.

In a state of being displayed as FIG. 3, when a user touches the dual button 415, the controller 100 may detect that the processing of the image synthesis mode is requested, and may display the dual button 415 as a dual on and may operate the rear camera.

Similarly, when the user selects the dual on by using the dual button 415 at the time point of driving the camera, the controller 100 may operate the front camera and the rear camera simultaneously.

Figure 4:
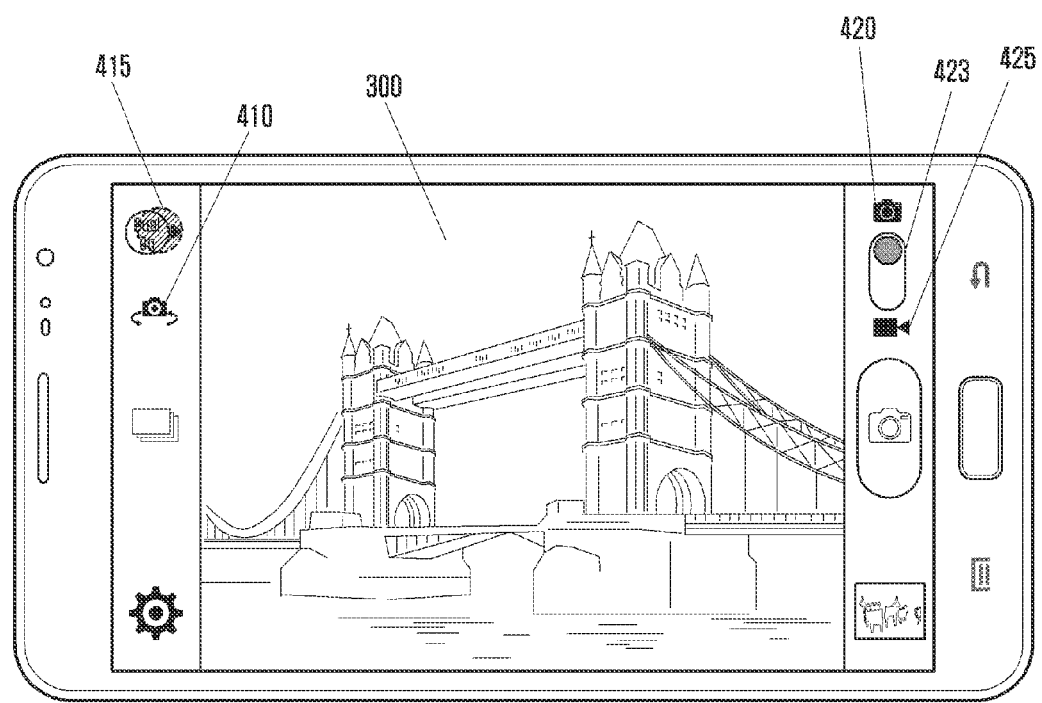
Figure 5A:
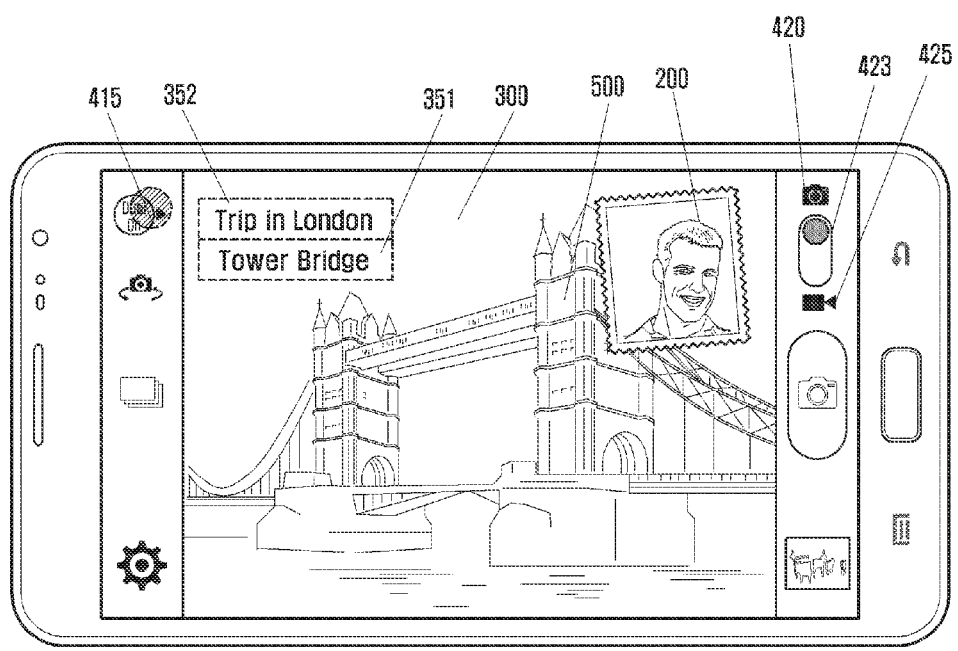

Thereafter, the controller 100 may obtain the user image through the front camera as illustrated in FIG. 3, and may obtain a background image 300 through the rear camera as illustrated in FIG. 4. In addition, the controller 100, for example, may generate a synthesized image 500 by cutting out the user image except for the background of the user image, and synthesizing a cut-out object image 200 with a background image 300 as illustrated in FIG. 5A. At this time, the cut-out object image 200 may be resized to be displayed as an overlay on a set position of the background image 300 or on a position selected by a user.

More particularly, the controller 100 may determine whether the cut-out object image 200 is identical to the stored image. If the cut-out object image 200 is identical to the stored image, the controller 100 may apply a first effect previously mapped to the corresponding image to the synthesized image 500.

For example, when the user image obtained from the front camera is identical to the user image previously stored in the portable terminal, as the first effect which is previously mapped to the user image, a processing of the user image in form of a stamp may be set.

A method of processing the user image may be different depending on the user image which is previously mapped and stored.

More particularly, as illustrated in FIG. 5A, the controller 100 may convert the object image 200 into the stamp shape according to the detected object image 200, and may synthesize thereof to the background image 300. In addition, the controller 100 may process the object images 220, 240 which are different from the object image detected in FIG. 5A to convert into a cartoon type as illustrated in FIG. 5B, or may process to convert into a bitmap type as illustrated in FIG. 5C, so that the synthesized image 500 may be processed according to a purpose or a content of a photo.

Similarly, the controller 100 may determine whether the background image 300 is identical to the stored image. If the background image 300 is identical to the stored image, the controller 100 may apply a first effect that is previously mapped to the corresponding image to the synthesized image 500.

For example, when the background image 300 obtained by the rear camera is identical to a landmark previously stored in the portable terminal, or to the background image previously stored by the user, the information data related to a location of the background image may be output to the synthesized image 500 as a first effect which is previously mapped to the stored corresponding background image.

Figure 5B:
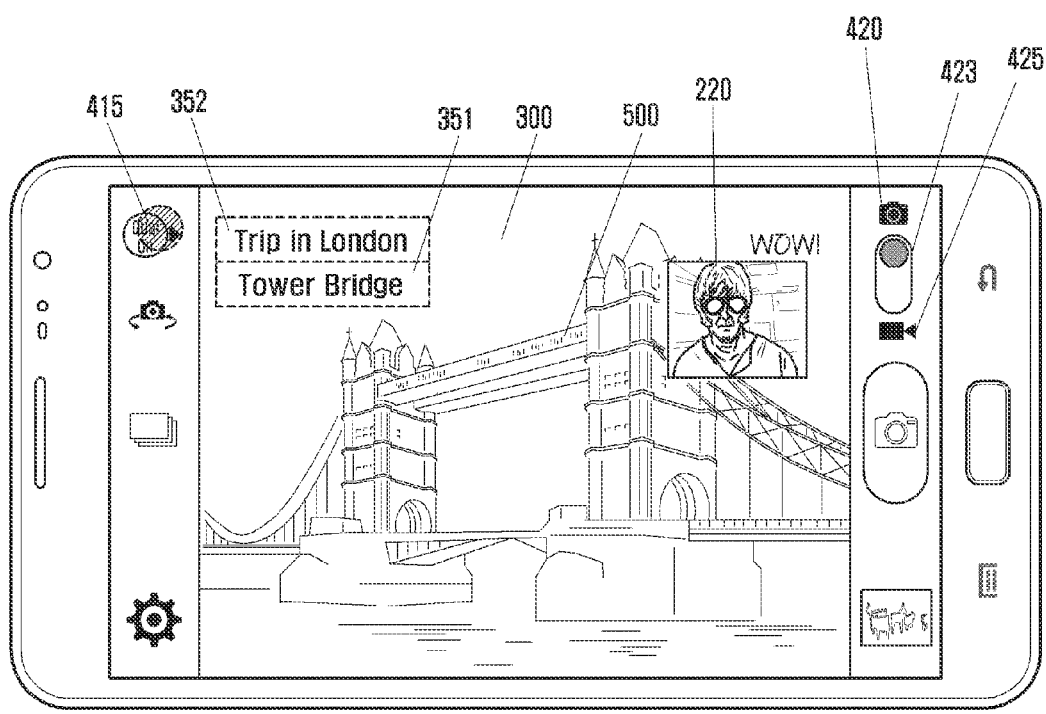
Figure 5C:
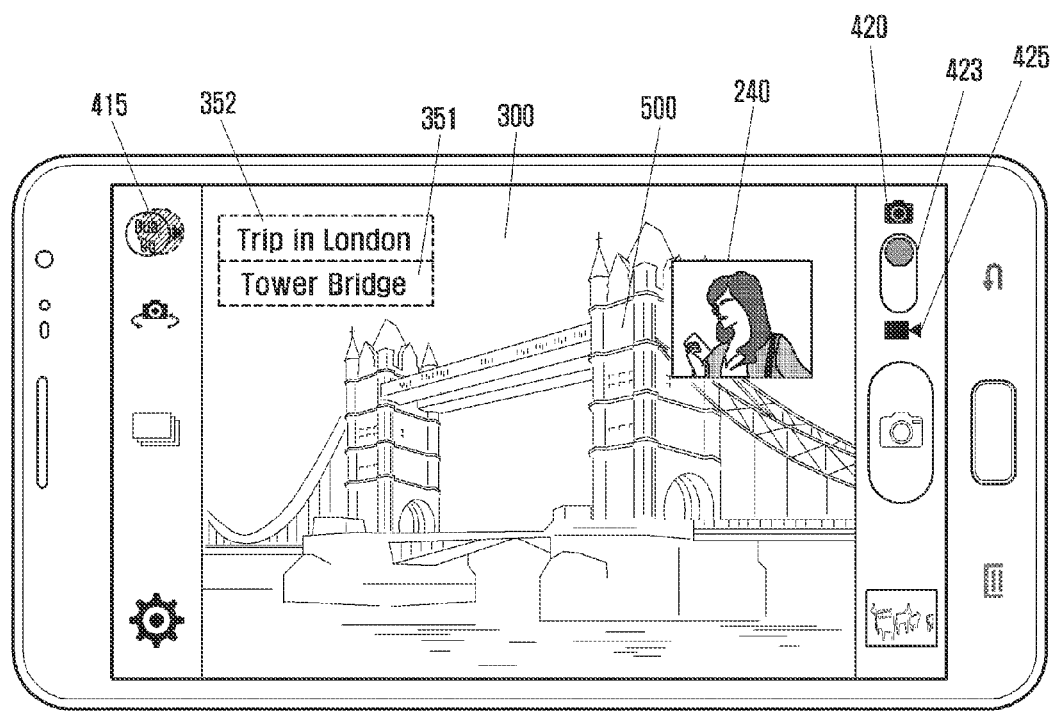

When the Tower Bridge in London is stored in the portable terminal as a landmark, and when the background image 300 obtained by the rear camera is determined as the Tower Bridge, a letter data, such as the 'Tower Bridge' 351, may be output to some parts of the synthesized image 500 as illustrated in FIGS. 5A, 5B, and 5C.

In addition, the controller 100 may detect the photographing based position information, and may determine whether the detected photographing based position is within the user's stored activity radius. For example, when the detected photographing based position is beyond the user's stored activity radius, the controller 100 may consider this situation as a travel or a long distance business trip. When the currently photographing preview image is detected as filed, the controller 100 may consider this situation as a travel, and output data indicating the travel to the synthesized image 500.

Similarly, when the detected photographing based position is beyond the user's stored activity radius, the currently photographing preview image is detected as the room, and when a subject, such as a table, a screen, a projector, and the like, is detected, it is considered as a business trip state, and data indicating the business trip may be output to the synthesized image 500.

Referring to FIGS. 5A, 5B, and 5C, the controller 100 extracts a letter data "Trip", and combines the information related to the Tower Bridge in London which is a result of a background image 300 comparison by using the landmark to output data related to a title 'Trip In London' 352 to the synthesized image 500.

Although not shown, the controller 100 may detect the photographing based time information, and may determine whether the detected photographing based time corresponds to the user's stored schedule. In addition, when the detected photographing based time corresponds to the user's stored schedule, the controller 100 may output the information data indicating a schedule corresponding to the photographing based time to the synthesized image 500. For example, when the photographing based time is detected as 6 p.m., and the time interval between 6 p.m. to 7 p.m. is previously stored as a leaving work time, data indicating the leaving work may be output to the synthesized image 500.

Figure 6:
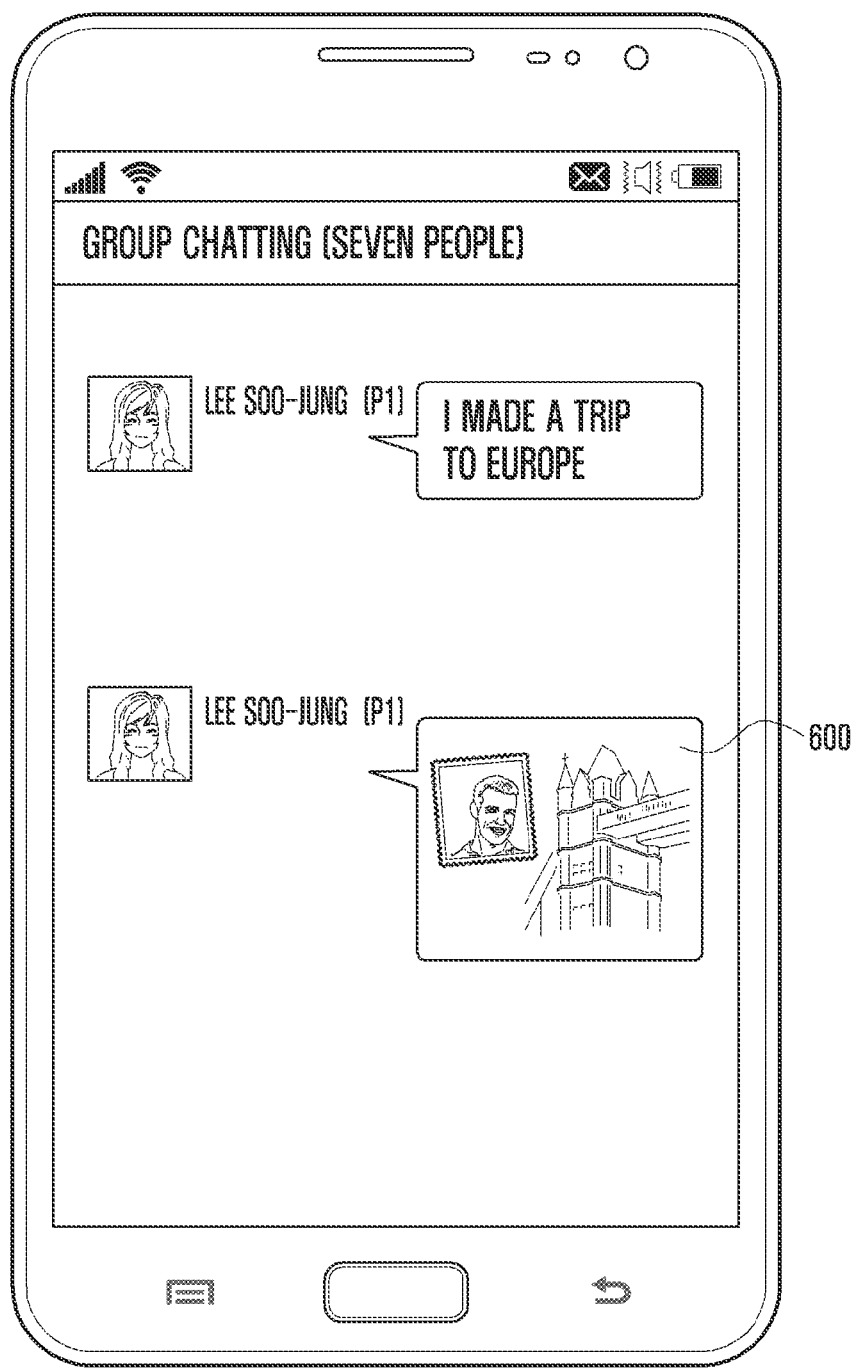
FIGS. 6 and 7 illustrate utilization of a synthesized image according to an embodiment of the present disclosure.
Figure 7:
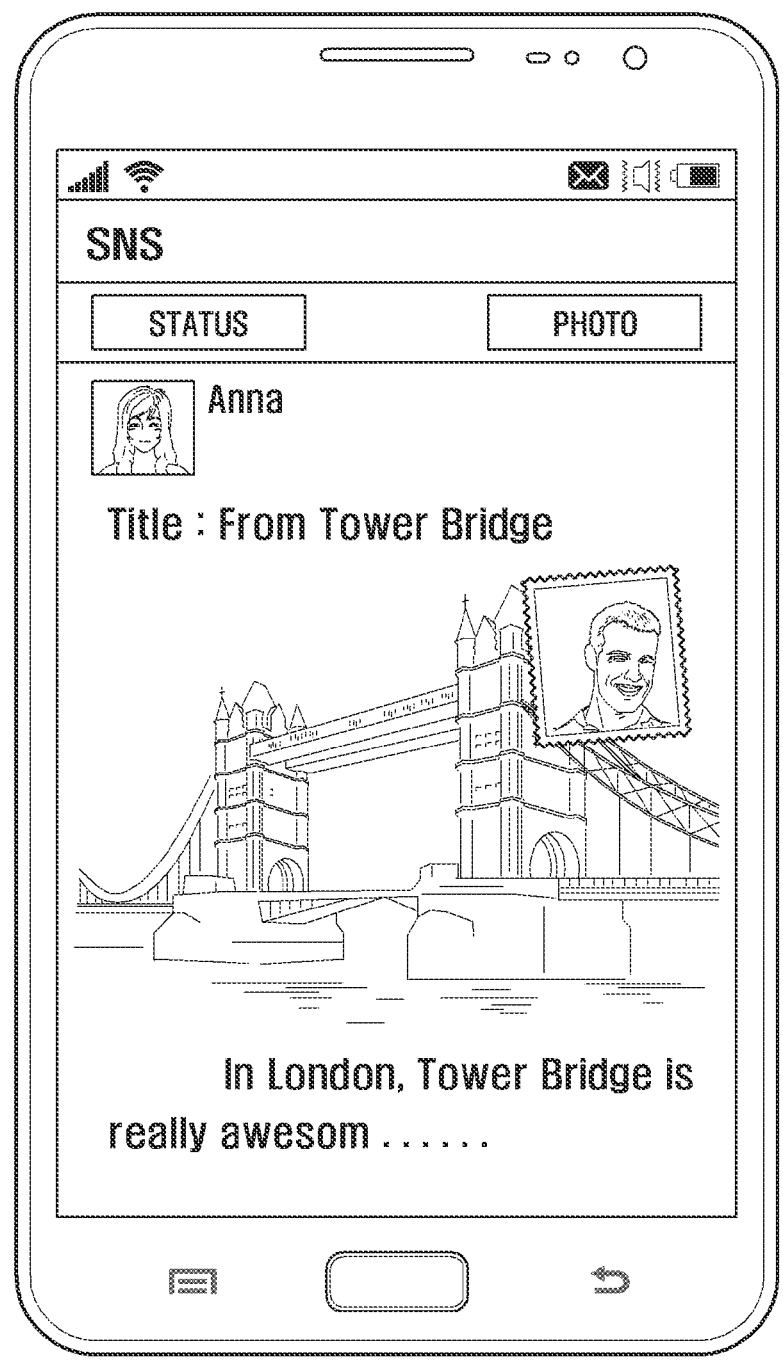

FIGS. 6 and 7 illustrate utilization of a synthesized image according to an embodiment of the present disclosure.

Referring to FIG. 6, the synthesized image generated by the method as described above may be stored, and may be applied as an emoticon 600 in a chatting window through a mobile instant messenger.

Although not shown, the emoticon 600 may be used by attaching the emoticon 600 to an email, and an electronic document in addition to the mobile instant messenger.

Referring to FIG. 7, an example of utilizing the synthesized image generated by the above described method when uploading the synthesized image to a Social Network Service (SNS) is illustrated. Referring to FIG. 7, an image synthesis device having a dual camera according to an embodiment of the present disclosure may automatically generate information data mapped to at least one of a user image and a background image as a title, and may automatically display the synthesized image when uploading an SNS without inputting the title related to the synthesized image separately.

For example, when the user uploads the stored synthesized image 500 to the SNS as illustrated in FIGS. 5A, 5B, and 5C, the controller 100 may extract the information related to the Tower Bridge which is previously mapped in relation to the detected background image 300, and may update the title of the image automatically as 'From Tower Bridge' together with the synthesized image 500.

The present disclosure according to the embodiment may obtain both the user image and the background image photographed in the dual camera by simultaneously or sequentially operating the dual camera in the portable terminal having the dual camera. In addition, it is determined whether at least one of the obtained user image and the background image is identical to the stored image, and accordingly, and a first effect previously mapped to the identical corresponding image is applied to the synthesized image so that information related to the image may be output automatically.

In addition, the present disclosure may detect the photographing based position and the photographing based time information, determine whether the photographing based position is included within the user's activity radius, or whether a stored schedule corresponding to the photographing based time exists, and accordingly, may automatically output information related to the user's current activity status or a schedule to the synthesized image.

In addition, the present disclosure enables to show the photographer's own figure, a background circumstance through a simultaneous photographing of the front camera and the rear camera when photographing and sharing, so that a signature may be generated and, at the same time, different effect may be provided to the front photo and the rear photo.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for processing an image on a portable terminal equipped with a dual camera, the method comprising:
    selecting an image synthesis mode;
    performing a simultaneous or a sequential photographing of a front camera and a rear camera;
    obtaining a first image and a second image through the front camera and the rear camera;
    detecting an object image from one of the first image and the second image;
    determining whether at least one of the obtained first image or second image is identical to a stored information and extracting a first effect which is previously mapped to the stored information when the at least one of the obtained first image or second image is identical to the stored information as a result of the determination;
    generating a synthesized image by synthesizing the object image to the other of the first image and the second image in which the object image was not detected and applying the first effect to the synthesized image; and
    displaying the synthesized image to which the first effect is applied,
    wherein the generating of the synthesized image comprises detecting at least one of a photographing based position information or a photographing based time information, extracting a second effect previously mapped to the at least one of information of the detected photographing based position or the photographing based time, and displaying the second effect to the synthesized image, and
    wherein the second effect comprises information related to at least one of a schedule or a location which is mapped to the at least one of the detected photographing based position information or the photographing based time information.

2. The method of claim 1,
    wherein the generating of the synthesized image by synthesizing the object image comprises displaying the object image as an overlay to the other of the first image and the second image in which the object image was not detected, and
    wherein the object image comprises at least one of an object or a person.

3. The method of claim 1, further comprising:
    detecting a background image of the other of the first image and the second image in which the object image was not detected,
    wherein the detecting of the background image comprises:
        recognizing at least one of an area where a similar color is widely distributed, an area where a pattern is repeated in a certain interval, or an area where a person is excluded, as a background image.

4. The method of claim 1, wherein the stored information is a stored image.

5. The method of claim 4, wherein the stored image comprises at least one of a landmark, a specific object previously set and stored by a user, or a specific person previously set and stored by a user.

6. The method of claim 4,
    wherein the first effect comprises at least one of:
        a process of adding at least one of an emoticon, a letter, a number, a symbol, or a picture data which is previously mapped to the corresponding image to the synthesized image, or
        a process of converting or editing at least one of a shape, a form, or a color of the synthesized image, and
    wherein the first effect comprises displaying at least one of the first image or the second image on the synthesized image by processing the at least one of the first image or the second image as a cartoon type or a bitmap type.

7. The method of claim 1, wherein the detecting of the at least one of the photographing based position information or the photographing based time information comprises:
    determining whether the photographing based position is within a user's stored activity radius, and
    determining whether the photographing based time corresponds to a user's stored schedule.

8. The method of claim 1, wherein the displaying of the second effect to the synthesized image comprises automatically outputting the information related to at least one of a schedule or a location which is mapped to at least one of the detected photographing based position information or the photographing based time information to the synthesized image.

9. The method of claim 1, further comprising:
    recommending an effect to be mapped to the synthesized image according to the first image and the second image,
    wherein the recommended effect comprises at least one of:
        a process of converting or editing a shape, a form, or a color of a synthesized image according to the object image and the background image, or
        a process of adding at least one of a letter, a number, a symbol, a picture, an emoticon, a voice, or an acoustic data indicating information related to the object image and the background image to the synthesizing image.

10. The method of claim 1, further comprising:
    automatically updating a title by extracting information which is mapped to at least one of the detected object image or the background image when uploading the synthesized image during an application processing function.

11. An apparatus for processing an image on a portable terminal equipped with a dual camera, the apparatus comprising:
- a first camera configured to be mounted on a rear side of the portable terminal, and to obtain a first image;
- a second camera configured to be mounted on a front side of the portable terminal, and to obtain a second image;
- a controller configured to:
  - detect an object image from one of the first image and the second image, determine whether at least one of the obtained first image or second image is identical to a stored information and extract a first effect which is previously mapped to the stored information when the at least one of the obtained first image or second image is identical to the stored information as a result of the determination,
  - generate a synthesized image by synthesizing the object image to the other of the first image and the second image in which the object image was not detected and apply the first effect to the synthesized image; and
- a display unit configured to display the synthesized image to which the first effect is applied and a second effect to the synthesized image,
- wherein the controller is further configured to:
  - detect at least one of a photographing based position information or a photographing based time information,
  - extract the second effect previously mapped to the at least one of information of the detected photographing based position or photographing based time, and
  - display the second effect to the synthesized image,
- wherein the second effect comprises information related to at least one of a schedule or a location which is mapped to the at least one of the detected photographing based position information or the photographing based time information.

12. The apparatus of claim 11, wherein the controller is further configured to display the object image as an overlay to the other of the first image and the second image in which the object image was not detected.

13. The apparatus of claim 12, wherein the controller is further configured to:
- detect a background image of the other of the first image and the second image in which the object image was not detected, and
- recognize at least one of an area where a similar color is widely distributed, an area where a pattern is repeated in a certain interval, or an area where a person is excluded, as a background image.

14. The apparatus of claim 11, wherein the stored information is a stored image.

15. The apparatus of claim 14, wherein the stored image comprises at least one of a landmark, a specific object previously set and stored by a user, or a specific person previously set and stored by a user.

16. The apparatus of claim 14,
- wherein the first effect comprises at least one of:
  - a process of adding at least one of an emoticon, a letter, a number, a symbol, or a picture data which is previously mapped to the corresponding image to the synthesized image, or
  - a process of converting or editing at least one of a shape, a form, or a color of the synthesized image, and
- wherein the first effect displays at least one of the first image or the second image on the synthesized image by processing the at least one of the first image or the second image as a cartoon type or a bitmap type.

17. The apparatus of claim 11, wherein the controller is further configured to:
- determine whether the photographing based position is within a user's pre-stored activity radius, and
- determine whether the photographing based time corresponds to a user's stored schedule.

18. The apparatus of claim 11, wherein the controller is further configured to automatically output the information related to at least one of a schedule or a location which is mapped to at least one of the detected photographing based position information or the photographing based time information to the synthesized image.

19. The apparatus of claim 11,
- wherein the controller is further configured to recommend an effect to be mapped to the synthesized image according to the detected object image and the background image, and
- wherein the recommended effect comprises at least one of:
  - a process of converting or editing a shape, a type, and a color of a synthesized image according to the first image and the second image, and
  - a process of adding at least one of a letter, a number, a symbol, a picture, an emoticon, a voice, or an acoustic data indicating information related to an image of a person and the background image.

20. The apparatus of claim 11, wherein the controller is further configured to automatically update a title by extracting information which is mapped to at least one of the detected object image or the background image when uploading the synthesized image during an application processing function.

* * * * *